United States Patent [19]

Weiselfish

[11] Patent Number: 5,027,133
[45] Date of Patent: Jun. 25, 1991

[54] PLOTTER PAPER ADVANCE CONTROL

[75] Inventor: Jacob Weiselfish, West Hartford, Conn.

[73] Assignee: Gerber Garment Technology, Inc., West Tolland, Conn.

[21] Appl. No.: 411,199

[22] Filed: Sep. 21, 1989

Related U.S. Application Data

[63] Continuation of Ser. No. 201,680, Jun. 2, 1988, abandoned.

[51] Int. Cl.⁵ ............... G01D 15/24; B65H 23/18; B41J 15/24
[52] U.S. Cl. ............................. 346/136; 226/24; 226/29; 226/42; 400/618; 346/139 R
[58] Field of Search ............ 346/136, 134 R; 226/24, 226/29, 44, 45, 42; 400/568, 902, 618;

[56] References Cited

U.S. PATENT DOCUMENTS

| | | | |
|---|---|---|---|
| 3,656,041 | 4/1972 | Bonzano | 318/318 |
| 3,874,791 | 4/1975 | Thieme et al. | 355/41 |
| 4,038,666 | 7/1977 | Fuller, Jr. | 346/136 |
| 4,456,193 | 6/1984 | Westover | 242/75.42 |
| 4,549,825 | 10/1985 | Fish, III et al. | 400/692 |
| 4,916,819 | 4/1990 | Gerber | 346/139 R X |

*Primary Examiner*—Benjamin R. Fuller
*Assistant Examiner*—Gerald E. Preston
*Attorney, Agent, or Firm*—McCormick, Paulding & Huber

[57] ABSTRACT

A paper advance control for a progressive X,Y plotter with unidirectional paper movement senses the actual advancement of the paper and controls the drive to a take-up roll in such a way as to keep the speed of advancement constant over the major portion of its advancement. It also through the same sensor keeps informed of its actual paper position and stops the paper with accurate positioning at the end of an advancement, its stopping procedure including a pre-stop slow down of the paper speed.

9 Claims, 6 Drawing Sheets

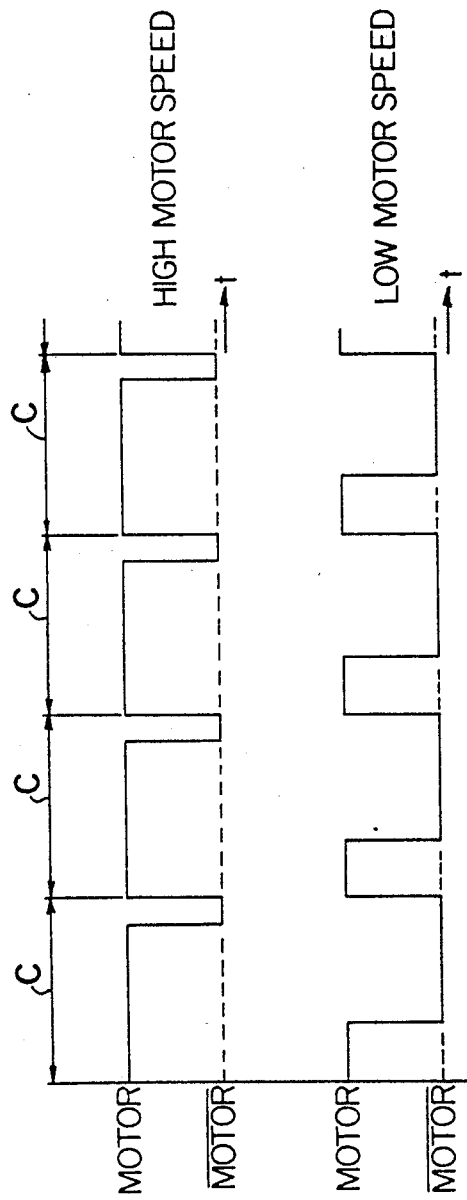

PLOTTER PAPER ADVANCE CONTROL

This is a continuation of co-pending application Ser. No. 07/201,680, filed on June 2, 1988, now abandoned.

CROSS REFERENCE TO RELATED APPLICATION

This application is related in subject matter to application Ser. No. 07/195128, filed May 17, 1988, now U.S. Pat. No. 4,916,819 in the name of Heinz Joseph Gerber entitled PROGRESSIVE PLOTTER WITH UNIDIRECTIONAL PAPER MOVEMENT and assigned to the same assignee as this application.

BACKGROUND OF THE INVENTION

This invention relates to plotters of the type for drawing graphics on elongated webs of sheet material and wherein the sheet material is advanced over a support surface, the actual drawing process occurring on the portion of the material supported by the support surface and a finished drawing having a length significantly longer than the length of the support surface in the direction of sheet material advancement, and deal more specifically with a means for controlling the advancement or the sheet material in such a plotter.

Plotters of the type with which the invention is concerned are commonly used with paper being the sheet material on which the drawings are made by a writing implement, such as a pen or pencil, forming part of the plotter. In keeping with this, for convenience, in the following description and claims the sheet material has been referred to as "paper". Materials other than ordinary paper, such as webs of plastic or photographic film, may nevertheless sometimes be used as the sheet material. It is therefore intended that the word "paper", as used herein, be interpreted broadly to comprehend all types of sheet materials which may be used with the plotter in question.

In plotters of the type where an elongated web of paper is advanced over a support surface it is important that the paper advancement be accurately measured so that a portion of a drawing created on one section of the paper will match precisely with another portion drawn on an adjacent section of the paper. For example, the plotter may be operated in a section-by-section mode in which case the paper is held stationary relative to the support surface while a portion of a drawing is drawn on the paper overlying the support surface by a writing implement moved by the plotter in X and Y coordinate directions. When that portion of the drawing is completed the plotting process is suspended and the paper web is advanced over the support surface to bring to it a new paper section. Drawing is then resumed on the new section to create another portion of the finished drawing, and such alternation between drawing and paper advancement is repeated until the drawing is finished. This requires that the paper be accurately located at the finish of each advancement for proper registration of adjacent portions of the drawing. It also is important for efficiency of throughput that the paper advancements be accomplished in as short a time as possible.

In plotters of the aforementioned type, it is also generally necessary prior to beginning a drawing that the paper means used to sense movement of the paper in the direction of advancement be set to an initialized condition in order for it to properly indicate the position relative to a reference point fixed to the support surface of a given reference point on the paper, and this initializing process often involves the wasteage of a substantial amount of paper.

The general object of the invention is therefore to provide a paper advance control system for a plotter wherein a paper web is moved over a support surface with the control achieving accurate positioning of the paper relative to the support surface. In keeping with this object a more particular object is to provide such a paper advance control particularly suited for operation of the plotter in a section-by-section mode and capable of assuring precise positioning of the paper relative to the support surface at the end of each paper advancement.

A further object of the invention is to provide a paper advance control of the foregoing character whereby the paper advancements are accomplished in relatively short periods of time to maximize the throughput of the plotter. In keeping with this object, the paper advancement means includes a supply roll and a take-up roll for the paper with the take-up roll being driven by a motor to achieve the paper advancement and with the motor being so energized as to achieve a predetermined uniform speed of the paper over the support surface throughout the major portion of each advancement regardless of the diameter of the take-up roll.

Another object of the invention is to provide a paper advance control system of the above-identified character including a paper advancement sensor which may be set to an initialized position relative to the paper without the potential for significant paper wastage.

Other objects and advantages of the invention will be apparent from the following description of a preferred embodiment and from the accompanying drawings and claims.

SUMMARY OF THE INVENTION

The invention resides in a plotter having a support surface for supporting a portion of an elongated paper web with the web being supplied to the support surface by supply and take-up rolls. A suitable drive drives the take-up roll to pull paper from the supply roll and advance it over the support surface, and such drive is energized by an associated driver in such way as to cause the paper to be advanced over the support surface at a predetermined speed not dependent on the diameter or the take-up roll.

The invention further resides in the means for energizing the drive of the take-up roll including a sensing wheel which engages and is rotated by the paper during an advancement and which has alternating opaque and transparent areas cooperating with a light emitter and photodetector to produce a series of electrical pulses the gaps between the leading edges of which correspond to a fixed angular rotation of the wheel and therefore to a fixed displacement of the paper. These pulses are converted to a paper speed signal compared to a reference speed signal to create an error signal controlling the energization of the drive motor in a feed-back control manner to maintain the paper advancement speed at the predetermined value set by the reference speed signal. The pulses are also sensed and used to determine the length of paper advancement from the start of an advancement, such length measurement being used in turn to control the stopping of the drive motor energization at the end of an advancement.

Still further, the invention resides in the control means for advancing the paper at a predetermined speed involving the use of a DC drive motor which, when energized with a continuous voltage, moves the paper at a speed greater than the predetermined speed even when the take-up roll diameter is at its minimum value, the speed of the motor then being controlled to obtain movement of the paper at the predetermined speed by supplying voltage to the motor in a pulse-width modulated or chopped manner.

The invention also resides in the drive motor being controlled by a driver responsive to signals appearing from a processor on two input lines to either excite the motor in a pulse width modulated manner or to short the terminals of the drive motor to provide a dynamic brake effect. The signals appearing on the two input lines to the driver and the operation of the driver being such that if either one of the two lines is in an open condition the motor will be de-energized.

BRIEF DESCRIPTION OF THE DRAWINGS

FIG. 6 is a schematic diagram showing the energization of the drive motor at two different speeds.

FIG. 7 is a truth diagram showing the motor condition achieved by different combinations of input signals to the motor driver.

DETAILED DESCRIPTION OF THE PREFERRED EMBODIMENT

Figure 1:
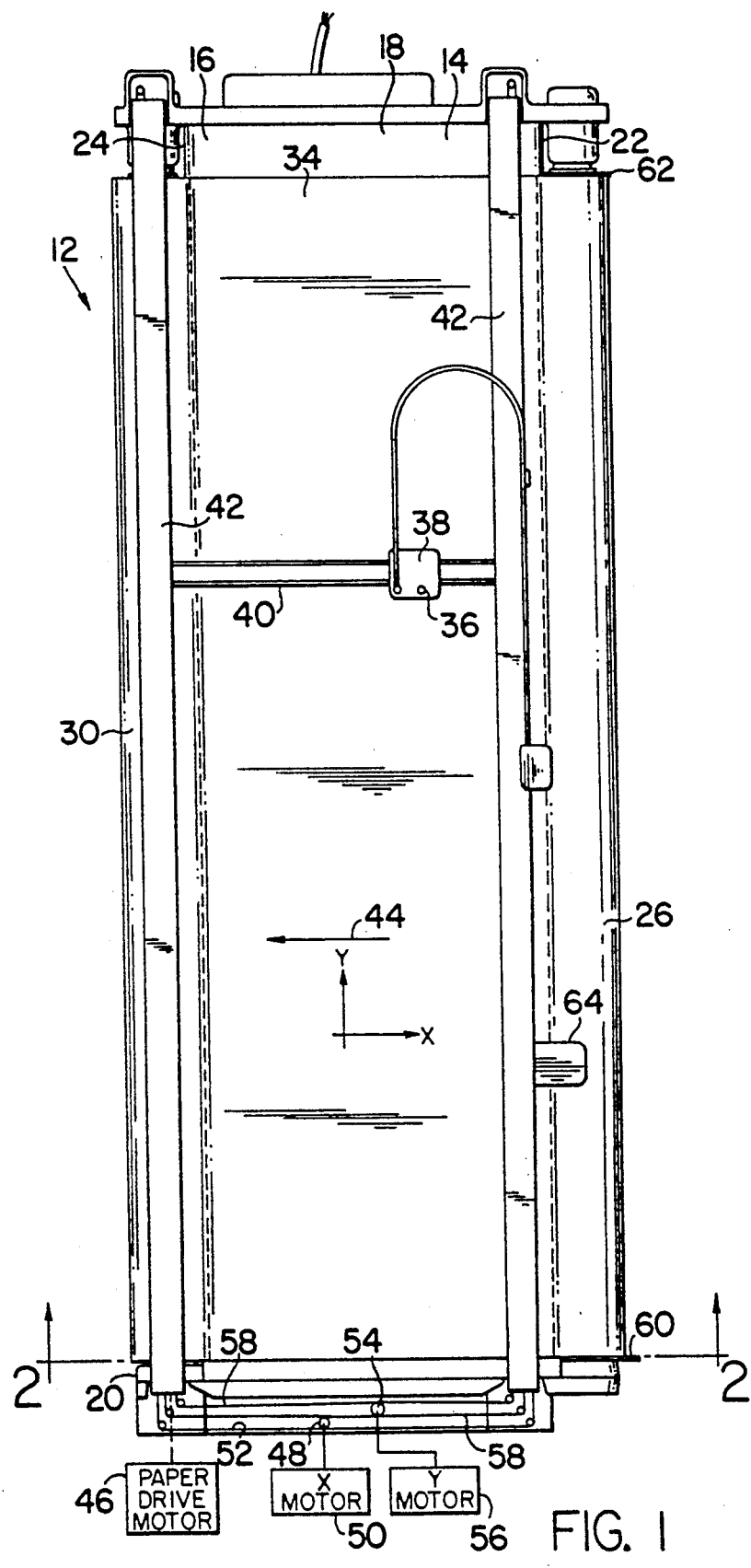
FIG. 1 is a plan view of a plotter having a paper advance control embodying the present invention.
Figure 2:
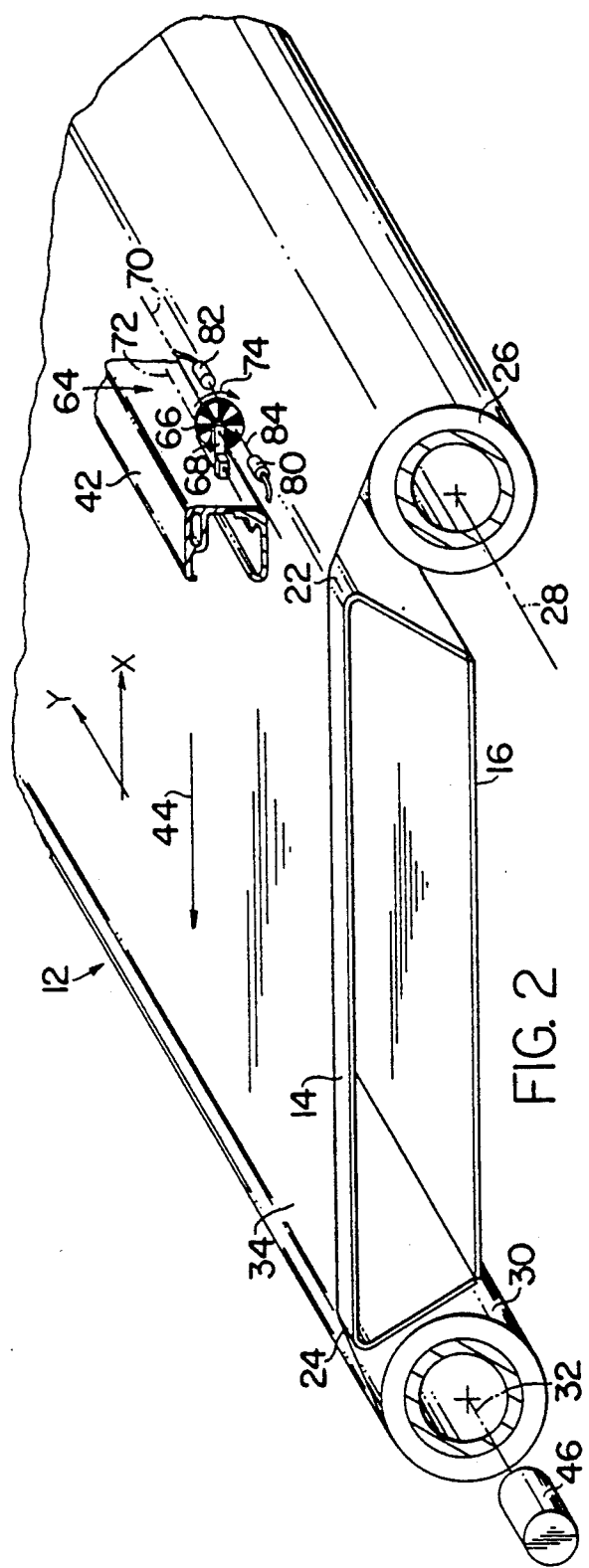
FIG. 2 is a fragmentary, somewhat schematic, cross-sectional and perspective view showing in more detail a portion of the paper advance control, the sectional portion of the view being taken generally on the line 2—2 of FIG. 1.

FIGS. 1 and 2 show, by way of example, an X,Y plotter 12 having a paper advance control embodying the present invention. This plotter is of the type shown and described in co-pending patent application Ser. No. 07/195,128 field 5-17-88, now U.S. Pat. No. 4,916,819 identified in more detail above, to which reference may be made for a further understanding of its details.

For the purposes of this application it is sufficient to note that the plotter 12 has an upwardly facing support surface 14 provided by a panel 16 extending between two end pieces 18 and 20. The support surface 14 is generally rectangular in shape and has two elongated side edges 22 and 24. A supply roll 26 of paper is supported adjacent the right-hand side edge 22 for rotation about an axis 28 parallel to and below the side edge 22. A take-up roll 30 is supported adjacent the left-hand side edge 24 for rotation about an axis 32 parallel to and below the edge 24.

The portion of paper 34 overlying the support surface 14 is drawn upon by a pen 36 or other writing implement carried by a pen carriage 38 for movement in the illustrated X coordinate direction along an elongated main or Y carriage 40. The main carriage 40 is supported at both of its ends for movement in the illustrated Y coordinate direction by two guide rails 42, 42 fixed relative to the support surface 14 and supported at their ends by the end pieces 18 and 20.

The paper 34 is advanced in the direction of the arrow 44, as seen in FIG. 1, by a paper drive motor 46 which drives the take-up roll 30 counter-clockwise as seen in FIG. 2 to achieve such advancement of the paper over the support surface. Movement of the pen 36 in the X and Y coordinate directions is achieved by a cable drive system for the pen carriage 38 and for the main carriage 40, the drive for the pen carriage 38 including a cable drum 48 driven by an X motor 50 and handling a cable 52, and the drive for the main carriage 40 including a cable drum 54 driven by a Y motor 56 and handling two cables 58, 58 associated respectively with the opposite ends of the carriage 40. When the paper drive motor 46 is energized to advance the paper 34 a retarding force is preferably applied to the paper on the supply roll 26. This retarding force may be supplied in various different ways, but in the illustrated case is supplied by a stationary friction disc 60 against which the adjacent end of the roll 26 is pressed by a spring biased flange 62 engaging the opposite end of the supply roll and urging it under spring pressure toward the friction disc 60.

The plotter 12 is a progressive one with unidirectional paper advancement over the support surface in the direction of the arrow 44. That is, the paper 34 only moves from right to left as seen in FIGS. 1 and 2 and the pen 36 is moved to draw on the paper 34 supported by the support surface by moving it in both the X and Y coordinate directions relative to support surface. Generally, a drawing very much longer than the spacing between the side edges 22 and 24 of the support surface is formed on the paper and is formed progressively by starting the drawing at its left-hand end and progressively creating the drawing by gradually moving the drawing process from the left-hand end of the drawing to the right-hand end of the drawing during which time the paper 34 is advanced from right to left over the support surface 14 to accommodate the advancement of the drawing process. Different modes of cooperation between the drawing process and the advancement of the paper may be used, but most often the drawing is made in a section-by-section manner in which drawing procedures alternate with paper advancements. That is, in creating a drawing section-by-section, after a section of paper 34 is moved onto the support surface 14 it is held stationary relative to the support surface while a portion of the finished drawing is created on that section. Then the drawing procedure is interrupted and the paper is advanced to bring a new section of it to the support surface. The drawing procedure is then resumed to create a further portion of the drawing on the section now supported by the support surface, and such alternation between drawing procedure and paper advancement is continued until the entire drawing is finished. So that the portion of the drawing created on one paper section matches with the portion drawn on the next adjacent section it is necessary that the amount of paper advanced during each advancement be accurately determined. Also, to maximize the throughput of the plotter it is essential that the paper advancements be accomplished as quickly as possible.

In accordance with the invention, a paper advance control system is included in the plotter 12 for achieving the desired aims of accurate and rapid paper advancement. A basic part of this system is a paper advance sensor responsive to the movement of the paper relative to the support surface and producing, when the paper advances, a train of electrical pulses the spacing between which corresponds to the displacement of the paper. That is, for example, the gap between the leading edges of two successive pulses represents a given displacement of the paper relative to the supporting surface.

Various different means may be used to provide paper displacement indicating electrical pulses without departing from the broader aspects of the invention, but preferably such displacement indicating means is a sensor unit 64 carried by the right-hand guide rail 42 and including a sensor wheel 66. As seen best in FIG. 2, the wheel 66 is rotatably supported by an arm 68 for rotation about an axis 70 perpendicular to the direction 44 of paper movement. The arm 68 is pivotally connected to the guide rail 42 for movement about an axis 72 parallel to the axis 70 of wheel rotation. The arm 68 is biased by gravity, and also possibly by an additional spring if needed, clockwise about the axis 72 so that the periphery of the wheel 66 is urged into engagement with the paper 34 causing the wheel to be rotated clockwise, in the direction of the arrow 74, when the paper moves in the direction of the arrow 44.

Figure 5:
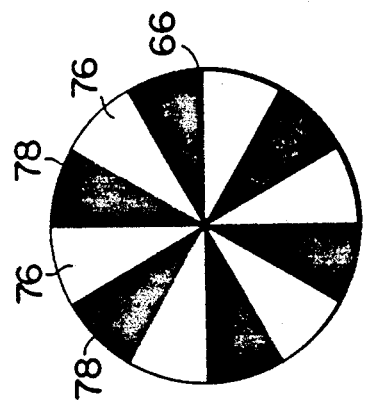
FIG. 5 is an elevational view of the sensing wheel of FIG. 2.

The wheel 66, as shown best in FIG. 5, is made of glass or other optical material and has six transparent sectors 76 alternating with six opaque sectors 88, with each sector 76 and 78 having an arc length of 30°. Located on opposite sides of the sensing wheel 66, as seen in FIG. 2, are a light emitter 80 and a photodetector 82, the emitter 80 being arranged to direct a beam of light 84 through the wheel 66 to the photodetector 82. When the beam 84 encounters one of the transparent sectors 76 of the wheel it passes through the wheel to the photodetector 82 to provide one level of electrical output from the detector. When the beam encounters one of the opaque sectors 78 of the wheel its passage to the photodetector 82 is interrupted to produce a different level of electrical output from the detector. Accordingly, it will be appreciated that as the wheel is rotated during a paper advancement a train of electrical pulses is produced from the photodetector 82 the spacing between the successive pulses of which is related to the displacement of the paper. That is, for example, between the appearance of the leading edge of one pulse and the appearance of the leading edge of the next pulse it will be known that a fixed length of paper has been advanced over the supporting surface, the exact amount of such displacement being dependent on the diameter of the sensing wheel 66 and on the number of transparent and opaque sectors making up the wheel.

Figure 3:
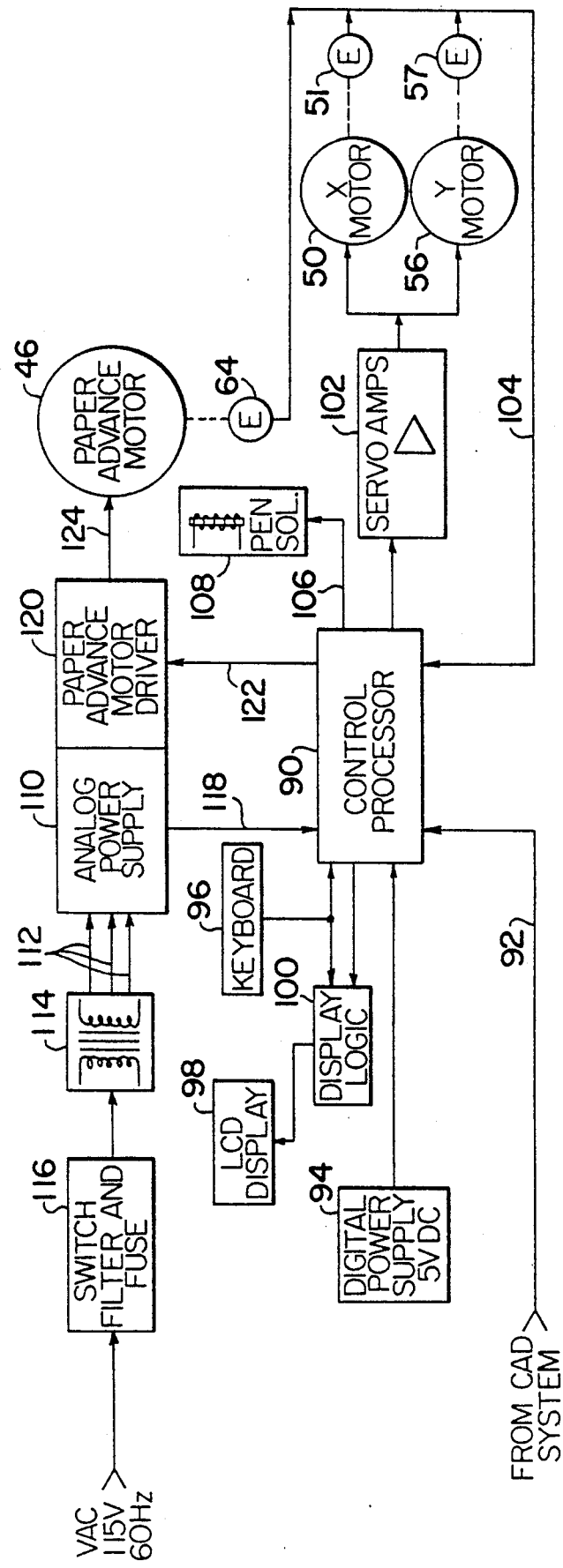
FIG. 3 is a schematic diagram of the control system for the plotter of FIG. 1.

Reference may now be made to FIG. 3 which shows the relationship of the paper advance motor 46 and paper displacement sensor unit 64 to the remainder of the control system for the plotter. As shown in that figure the plotter is under the basic control of a control processor 90. Data determining the drawing to be produced by the plotter is supplied to the control processor 90 over an input line 92 from an associated computer-assisted design system or the like. Power for the processor is provided by a 5-Volt DC digital power supply 94. Inputs to the control processor 90 allowing local control of the plotter are supplied through a keyboard 96. Information helpful to the operator and originating from either the keyboard 96 or the processor 90 is displayed by an LCD display 98 through a display logic circuit 100. The control processor provides signals to servo amplifiers 102 which energize the X and Y motors 50, 56 to drive the pen 36 in the X and Y coordinate directions. Encoders 51 and 57 drivingly connected respectively with the X and Y motors provide X and Y pen actual position signals fed back to the control processor 90 over a position feedback line 104. The processor also supplies signals over a line 106 to a pen solenoid 108 on the pen carriage 38 for moving the pen or other writing implement between a lowered writing position and a raised non-writing position.

DC voltages at different levels as needed by the control processor 90 are supplied by an analog power supply circuit 110. The power supply 110 has as its inputs a number of lines 112 from a transformer 114 connected to a suitable source of alternating voltage through a switch, filter and fuse unit 116. The lines 112 provide the analog power supply 110 with alternating voltages of different amplitudes and the analog power supply includes rectifiers and filters for converting such alternating voltages to filtered DC voltages as required by the control processor. The DC output voltages produced by the analog power supply 110 are supplied to the control processor 90 over the line 118.

A paper advance motor driver 120 is preferably located on the same circuit board as the analog power supply 110 and is controlled by signals supplied to it by the control processor 90 over the line 122. As indicated by the line 124 of FIG. 3, the motor driver 120 controls the energization of the paper advance motor 46. When the motor 46 is energized to advance the paper, as previously mentioned, the paper advance sensor 64 is actuated and produces paper advancement indicating pulses transmitted to the control processor 90 through the feedback line 104.

Figure 4:
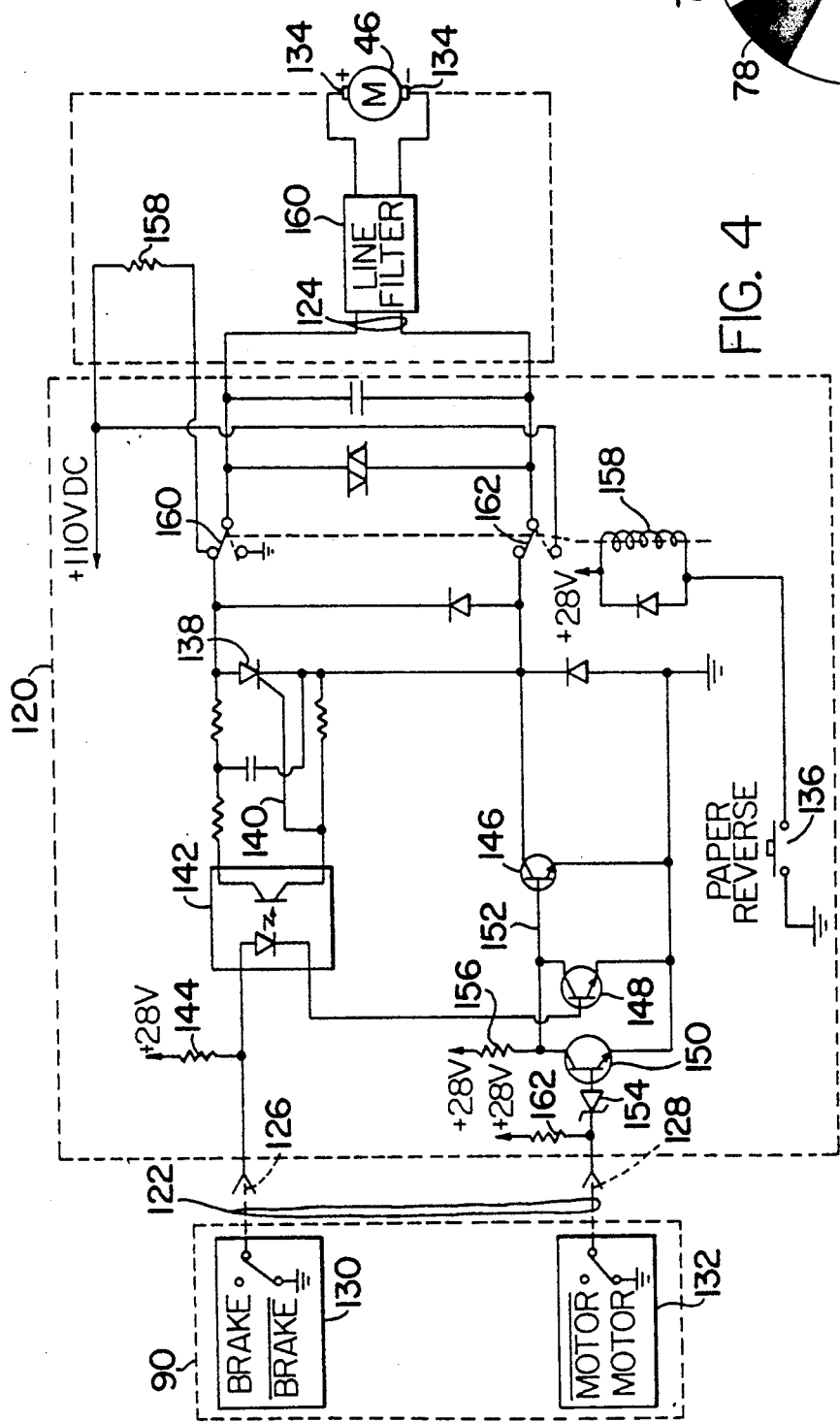
FIG. 4 is a schematic diagram showing in more detail the paper advance motor driver of FIG. 3.

FIG. 4 shows in more detail the construction of the motor driver 120. As shown in this figure the line 122 of FIG. 3 actually consists of two separate conductors 126 and 128 connecting the processor 90 to the driver 120. Internally, the processor 90 operates, as indicated at 130 in FIG. 4, to switch the conductor 126 between a grounded condition and an open condition. The open condition of the line 126 represents a BRAKE signals while the grounded condition of the line represents a $\overline{\text{BRAKE}}$ signal. As to the conductor 128 the processor internally functions, as indicated at 132, to switch the conductor between a grounded and an open condition, with the grounded condition representing a MOTOR signal and with the open condition representing a $\overline{\text{MOTOR}}$ signal.

In response to the signals appearing on the input conductors 126 and 128 the motor driver 120 functions to either apply an energizing DC voltage across the input terminals 134, 134 of the motor 46 to cause rotation of the motor, or to short the terminals 134, 134 to one another to apply a dynamic brake effect to the motor. When the motor is energized it is normally energized with voltage of the polarity indicated at the motor terminals 134, 134 in FIG. 4 to cause rotation of the motor in such direction as to wind paper onto the take-up roll thereby pulling paper from the supply roll and advancing it in the direction of the arrow 44 over the support surface. If desired, however, the polarization of the energizing voltage applied to the motor may be reversed, by pushing the paper reverse push-button 136, to cause rotation of the motor in the opposite direction thereby rotating the take-up roll in the unwinding direction to, for example, unwind from it a finished drawing.

During a normal operation of the motor driver 120, that is when the paper reverse push-button 136 is unoperated, the driver responds to the signals appearing on the input conductors 126 and 128 in the manner shown by the truth table of FIG. 7. That is, the motor is energized only when the MOTOR signal appears simultaneously with the $\overline{\text{BRAKE}}$ signal. For all of the other three possible combinations of signals on the two lines 126 and 128 the motor is unenergized, and the motor terminals are further shorted to one another whenever the BRAKE signal appears on the line 126. Therefore, it will be evident from FIG. 7 that whenever either one or both of the two input conductors 126 and 128 is in an open condition, as may happen accidentally, the motor 46 is de-energized in a fail-safe manner.

The construction and operation of the motor driver 120 in accordance with the truth table of FIG. 7 can be explained as follows with reference to FIG. 4. The shorting or non-shorting of the motor terminals 134 is controlled by an SCR 138 which is turned on by a control voltage appearing on the line 140. The line 140 is connected to the conductor 126 through an optical isolator 142, and the conductor 126 is connected to a source of +28 volts through a resistor 144. When the conductor 126 is grounded by the processor 90 to produce a $\overline{\text{BRAKE}}$ signal a zero potential is applied by the optical isolator 142 to the line 140 which maintains the SCR 138 in a non-conducting condition, thereby maintaining the terminals 134, 134 of the motor 46 in an open or unshorted condition. On the other hand, when the processor 90 holds the conductor 126 in an open condition, corresponding to the BRAKE signal, a voltage of +28 volts is applied to the conductor 136 through the resistor 144, and through the optical isolator 142 a corresponding voltage is applied to the line 140 which switches the SCR 138 to a conducting condition thereby shorting the motor terminals 134, 134 to one another and applying a dynamic brake effect to the motor 46.

Assuming the SCR 138 is non-conducting, the energization of the motor 46 is controlled by a transitor 146. That is, when the transistor 146 is in a conducting state the motor is energized and when the transistor 146 is in a non-conducting state the motor is de-energized. The condition of the transistor 146 is in turn controlled by two other transistors 148 and 150. The base of the transistor 148 is connected to the input conductor 126 through the input side of the optical isolator 142 so that whenever a positive voltage appears on the conductor 126 the transistor 148 is switched to a conducting condition thereby shorting the line 152, connected to the base of the transistor 146, to ground and thereby holding the transistor 146 in a non-conducting condition. In other words, when the BRAKE signal appears on the line 126 the transistor 146 is held in a non-conducting state so that no attempt is made to energize the motor.

The transistor 150 has its base connected to the input conductor 128 through a zener diode 154. When the conductor 128 is grounded by the processor 90 the transistor 150 is held in a non-conducting state and +28 volts is applied to the line 152 through the resistor 156. This switches the transistor 146 to its conducting state and energizes the motor 46 from the indicated +110 voltage sources through the resistor 158 and line filter 160.

When the processor 90 holds the input line 128 in an open condition, corresponding to the $\overline{\text{MOTOR}}$ signal, +28 volts is applied to the base of transistor 150 through the resistor 162. This turns on the transistor 150 and applies ground potential to the line 152, turning off the transistor 146 and thereby preventing energization of the motor 46.

As explained further hereinafter, during a paper advancement the motor 46, in order to control the speed of paper advancement, instead of being continuously energized, is energized with a chopped or pulse-width modulated voltage, which means that during the advancement the transistor 146 is repeatably turned on and off by the processor 90, by repeatedly switching between MOTOR and $\overline{\text{MOTOR}}$ signals on the conductor 128. In addition to energizing the motor 46 in this manner to rotate the take-up roll in the take-up direction, the energization of the motor may also be reversed by pushing the paper reverse push-buttom 136 of FIG. 4. Pushing the button 136 energizes the coil 158 of a relay switch which shifts the associated contacts 160 and 162 from their illustrated full line positions to their indicated broken line positions. In the latter position of the contacts 160 and 162 the 110 volt supply voltage is applied to the motor 46 in the polarity reverse of that indicated and without bringing into play either the motor shorting SCR 138 or the motor energization controlling transistor 146. Therefore, when the paper reverse button is pushed the motor 46 is energized continuously at the full 110 volt voltage to rotate the take-up roll in the unwinding direction without any speed control being applied to the motor.

Figure 8:
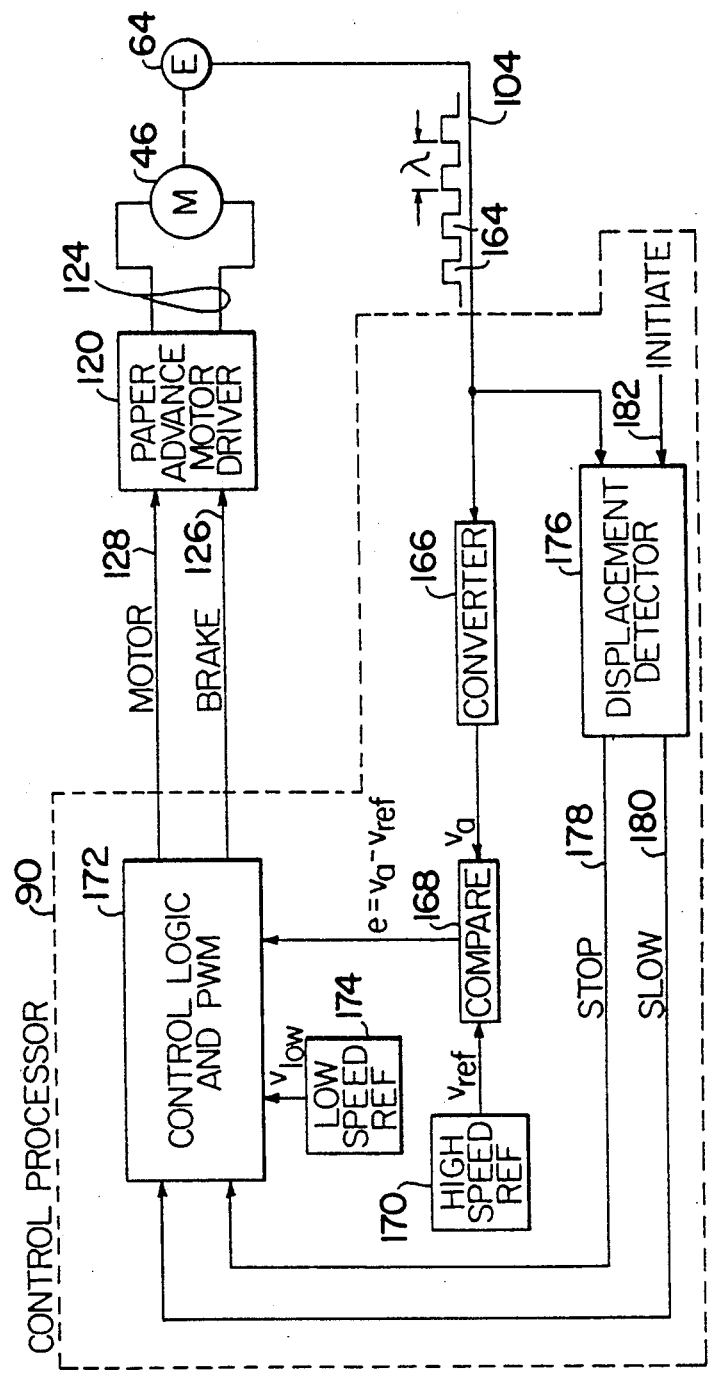
FIG. 8 is a schematic diagram showing functionally the manner in which the control processor converts pulses from the sensing wheel to control signals applied to the paper advance motor driver.

In normal operation of the motor driver 120, that is when the paper reverse push-button 136 is unoperated, the processor 90 in response to the electrical pulses received from the paper displacement sensor unit 64, and through the supply of signals applied to the input conductors 126 and 128, controls the motor driver so as to achieve both a fixed high speed of advancement of the paper during most of an advancement and to also achieve a precise stopping of the paper movement at the end of each advancement. The manner in which this is done may be understood by reference to FIGS. 6 and 8. As indicated in FIG. 8 when the motor 46 is energized the paper displacement sensing unit 64 in response to the paper displacement produces a train of pulses, such as indicated at 164, appearing on the line 104 such that the spacing $\lambda$ between the leading edges of successive pulses represents a fixed displacement of the paper relative to the supporting surface 14.

For controlling the speed of paper advancement, the pulses 164 are converted by a converter portion 166 of the processor to a signal $v_a$ representing the actual paper speed. This signal is compared in a compare portion 168 of the processor with a high speed reference signal $V_{ref}$ stored in a high speed reference memory portion 170 of the processor to produce an error signal $e$ supplied to a control logic and pulse-width modulator portion 172 of the processor. A low speed signal $V_{low}$ is also supplied to the control logic and pulse-width modulator 172 from a low speed memory 174.

For controlling the starting and stopping of paper advancements, the pulses 164 are also supplied to a displacement detector portion 176 of the processor 90. The displacement detector 176 is connected to the control logic and pulse-width modulator 172 by a STOP signal control line 178 and a SLOW signal control line 180. The displacement detector also has another input line 182 to which an INITIATE signal may be applied by the processor.

To achieve the advancement of paper, the processor 90, with reference to FIG. 8, operates in the following manner. After the portion of a drawing to be drawn on a given section of paper has been completed the processor stops the operation of the drawing procedure and applies an INITIATE signal to the input line 182 of the displacement detector 170. This removes both the STOP and the SLOW signals from the lines 178 and 180. In response to the removal of the STOP signal the control logic and pulse-width modulator 172 begins applying alternating MOTOR and $\overline{\text{MOTOR}}$ signals to the line 128, causing the paper advance motor driver 120 to energize the motor 46 and starting advancement of the paper. As soon as the paper starts to advance the sensor 64 produces pulses 164 which are converted to an actual speed signal $V_a$ by the convertor 166 and compared to the $V_{ref}$ signal to produce an error signal e to which the control logic and pulse-width modulator 20 responds in a feedback manner so as to reduce the error signal thereby bringing the motor energization to the state of driving the paper at exactly the high speed set by the $V_{ref}$ signal.

The motor 46 is selected so as to have a rotational speed when continuously energized by the energization voltage more than sufficient to advance the paper at the desired high speed even when the take-up roll is of a minimum diameter. Therefore, to achieve the desired high advancement speed it is necessary to have the motor rotate at a slower speed, and this is achieved by chopping or pulse-width modulating the voltage supplied to the motor. With reference to FIG. 6, this is done by having the processor divide the energization time of the motor into a plurality of successive energization cycles C, C. During one portion of each cycle C the motor is energized and during another portion the motor is de-energized. The upper portion of FIG. 6 shows the MOTOR and $\overline{\text{MOTOR}}$ signals appearing on the input conductor 128 and corresponding to a relatively high speed operation of the motor, while the lower portion of FIG. 6 shows the corresponding signals for producing a low speed operation of the motor. In effect, it will be understood that the MOTOR signals are pulse-width modulated by the processor 90 to achieve control of the motor speed. It will also be understood that the speed of paper advancement is dependent not only on the motor speed but also on the diameter of the take-up roll. The effect of the control system of FIG. 8 is to directly sense the paper speed and to maintain it at the desired high value regardless of the take-up roll diameter, the motor 46 being energized to rotate at whatever speed is required to maintain the set paper speed despite the diameter of its take-up roll.

The displacement sensor 176 from the start of an advancement counts the pulses 164 produced by the sensor 64 and in response to such count stops the paper advancement after a given amount of paper has been displaced, and preferably the stopping of the advancement includes a slowing of the motor 46 for a short time in advance of the actual stopping. In particular, the displacement detector 176 counts the pulses 164 until it detects that a given first amount of paper has been advanced from the start of the advancement. Upon making this detection the detector produces a SLOW signal on the line 180 which causes the control logic and pulse-width modulator 172 to switch its speed control from the error signal supplied by the compare circuit supplied by the compare circuit 168 to the low speed signal supplied by the low speed reference 174. The control logic and pulse-width modulator 172 thereupon supplies during each energization cycle MOTOR pulses of reduced duration to the paper advance motor driver to cause the motor 46 to be operated at a substantially lower speed than during the previous portion of the advancement. Thereafter, when the displacement detector 176 senses that the paper from the beginning of the advancement has advanced to another amount, the detector produces a STOP signal on the line 178 which causes the control logic and pulse-width modulator 172 to apply a continuous $\overline{\text{MOTOR}}$ signal on the conductor 128 and a BRAKE signal on the line 126 thereby stopping the energization of the motor 46 and shorting its input terminals to apply to it a dynamic brake, thereby immediately stopping the motor 46 and the associated advancement of the paper.

The processor 90 then initiates and controls a further drawing procedure on the portion of the paper which is now supported on the supporting surface. At the end of that procedure the drawing process is stopped and another initiate signal is supplied to the displacement detector 176 to begin a new paper advancement which proceeds in the same manner as discussed above, and the alternation of paper advancements with drawing procedures is continued until the drawing in question is completed.

At the start of making a new drawing the sensor 64 is initialized by slowly advancing the paper until the leading edge of a pulse 164 appears, and the positions of the paper and of the sensing wheel 66 at that time are taken as their initialized reference positions. It will be understood that such initialized positions are reached with no more than 60° of rotation of the sensing wheel, thereby wasting little paper during the initializing process.

I claim:

1. In a plotter for producing graphics on an elongated web of paper, the combination comprising:
    means providing a support surface for supporting, for drawing on it, a section of an elongated web of paper, means for supporting a supply roll and a take-up roll for respectively supplying and taking up an elongated web of paper with the paper passing from said supply roll over said support surface and to said take-up roll, a drive means for rotatably driving said take-up roll in a take-up direction so as to pull paper from said supply roll and advance it over said support surface, and means for energizing and drive means to controllably rotate said take-up roll at varying speeds to cause the paper of said web to be advanced over said support surface at a fixed predetermined speed not dependent on the diameter of said takeup roll;
    said drive means for rotatably driving said take-up roll including a DC drive motor having such a speed when continuously energized to drive said take-up roll in the take-up direction as to advance paper over said support surface at more than said predetermined speed even when said take-up roll is of its minimum diameter, and means for controlling the speed of said motor by pulse-width modulating the voltage supplied to it such that the voltage supplied to the drive motor is in the form of a plurality of successive energization cycles during one portion of each cycle the motor is energization cycles during one portion the motor is de-energized and advancing said web over said support surface at said fixed predetermined speed is accomplished by controllably varying the energized and the de-energized portions of said energization cycles.

2. The combination defined in claim 1 further characterized by said means for energizing said drive means for said take-up roll further including a means for sensing the actual speed of movement of said paper relative to said support surface and for producing a signal related to said actual paper speed, means providing a paper speed reference signal, means comparing said actual paper speed signal to said reference paper speed signal to produce an error signal, and means responsive to said error signal for energizing said take-up roll drive means so as to reduce said error signal.

3. The combination defined in claim 2 further characterized by said means for sensing the speed of said paper relative to said support surface and for producing a signal related to the actual paper speed including a sensing wheel supported for rotation about an axis perpendicular to the direction of paper movement over said support surface and engagable at its periphery with said paper so as to be rotated about said axis as said paper moves relative to said support surface, and means associated with the said sensing wheel for producing electrical pulses in response to the rotation of said wheel about said axis with the gaps between successive ones of the leading edges of said pulses each corresponding to a fixed angular rotation of said wheel, and means for converting said pulses to said actual paper speed signal.

4. The combination defined in claim 3 further characterized by said sensing wheel having a plurality of optically transparent areas alternating with a plurality of optically opaque areas in a direction concentric with said axis of sensing wheel rotation, and a light emitter and light detector located on opposite sides of said wheel so that a pulsed electrical output is produced from said optical detector by a chopping of the light path between said light emitter and said photodetector by said optically transparent and opaque areas of said sensing wheel.

5. The combination defined in claim 1 further characterized by means for reversing the direction of the drive of said take-up roll to unwind from it a portion of said elongated web of paper previously wound onto it during rotation of said take-up roll in its take-up direction.

6. The combination defined in claim 5 further characterized by said drive means for rotatably driving said take-up roll including a DC drive motor which is energized with DC voltage of one polarity to rotatably drive said take-up roll in said take-up direction, and said means for reversing the direction of the drive of said take-up roll including means for reversing the polarity of the voltage supplied to said motor to cause said motor to rotate in the opposite direction.

7. In a plotter for producing graphics on an elongated web of paper, the combination comprising:
means providing a support surface for supporting, for drawing on it, a section of an elongated web of paper, means for supporting a supply roll and a take-up roll for respectively supplying and taking up an elongated web of paper with the paper passing from said supply roll over said support surface and to said take-up roll, a drive means for rotatably driving said take-up roll in a take-up direction so as to pull paper from said supply roll and advance it over said support surface, and means for energizing said drive means so that the paper of said web is advanced over said support surface at a predetermined speed not dependent on the diameter of said take-up roll, said drive means including a DC drive motor having input terminals across which an energizing DC voltage may be applied, means for producing a paper advance INITIATE signal, means responsive to said INITIATE signal for first energizing said drive means by applying an energizing DC voltage across said input terminals of said motor so as to advance said paper web at said predetermined speed over said support surface, advancement sensing means for sensing the length of paper advanced from the start of an advancement, means responsive to said advancement sensing means for changing the energization of said drive means as to slow the speed of advancement of said paper upon a first given length of paper having been advanced from the start of an advancement, and means responsive to said advancement sensing means for stopping the energization of said drive means so as to stop its advancement of said paper over said support surface upon a second given length of paper having been advanced from the start of an advancement, said means for stopping the energization of said drive means including means responsive to said advancement sensing means having sensed the advancement of said second length of paper from the start of an advancement for discontinuing the supply of voltage across said input terminals of said drive motor and for shorting said input terminals to one another to apply a dynamic brake to said motor.

8. The combination defined in claim 7 further characterized by a driver for said motor having a first input conductor for BRAKE and $\overline{\text{BRAKE}}$ signals and a second input conductor for MOTOR and $\overline{\text{MOTOR}}$ signals, a processor supplying BRAKE and $\overline{\text{BRAKE}}$ signals to said driver over said first input conductor and MOTOR and $\overline{\text{MOTOR}}$ signals to said driver over said second input conductor, said driver operating to turn said motor ON by applying an energizing voltage across said input terminals of said motor only when said MOTOR and $\overline{\text{BRAKE}}$ signals appear simultaneously on said input conductors and to short said motor input terminals to one another whenever said BRAKE signal appears as an input to said driver on said second input conductor.

9. The combination defined in claim 8 further characterized by said MOTOR signal being represented by a grounding and said $\overline{\text{MOTOR}}$ signal being represented by an opening of said first input conductor, and said BRAKE signal being represented by an opening and said $\overline{\text{BRAKE}}$ signal being represented by a grounding of said second input conductor so that with either one or both of said input conductors being in open condition said motor is de-energized.

\* \* \* \* \*

UNITED STATES PATENT AND TRADEMARK OFFICE
CERTIFICATE OF CORRECTION

PATENT NO. : 5,027,133

DATED : JUn. 25, 1991

INVENTOR(S) : Jacob Weiselfish

It is certified that error appears in the above-identified patent and that said Letters Patent is hereby corrected as shown below:

Column 1

Line 24   please delete "deal" and substitute --deals--.
Line 26   delete "or" and substitute --of--.

Column 2

Line 49, delete "or" and substitute --of--.

Column 3

Line 51   delete "field" and substitute --filed--.

Column 10

Line 50, delete "and" and substitute --said--.

Line 66, delete "energization" and substitute --energized--.
Line 67, delete "cycles during one portion" and substitute
--and during another portion--.

Signed and Sealed this

Twenty-fourth Day of November, 1992

Attest:

DOUGLAS B. COMER

*Attesting Officer*     Acting Commissioner of Patents and Trademarks